United States Patent
Vinson

(10) Patent No.: US 12,112,778 B2
(45) Date of Patent: Oct. 8, 2024

(54) DATA STORAGE DEVICE WITH ADJACENT TRACK INTERFERENCE-AWARE SERVO TRAJECTORIES

(71) Applicant: WESTERN DIGITAL TECHNOLOGIES, INC., San Jose, CA (US)

(72) Inventor: Wayne H. Vinson, Longmont, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,073

(22) Filed: Aug. 9, 2023

(65) Prior Publication Data

US 2024/0221785 A1 Jul. 4, 2024

Related U.S. Application Data

(60) Provisional application No. 63/436,209, filed on Dec. 30, 2022.

(51) Int. Cl.
*G11B 5/54* (2006.01)
*G11B 5/596* (2006.01)

(52) U.S. Cl.
CPC ................ *G11B 5/59688* (2013.01)

(58) Field of Classification Search
CPC . G11B 5/5543; G11B 20/10388; G11B 21/12; G11B 5/5547; G11B 5/56; G11B 5/58; G11B 27/36; G11B 5/59633
USPC .......................................................... 360/75
See application file for complete search history.

(56) References Cited

U.S. PATENT DOCUMENTS

| | | | |
|---|---|---|---|
| 7,639,447 B1 | 12/2009 | Yu et al. | |
| 7,974,029 B2 | 7/2011 | Tsai et al. | |
| 8,699,172 B1 | 4/2014 | Gunderson et al. | |
| 8,806,117 B2 | 8/2014 | Islam et al. | |
| 8,941,935 B1 | 1/2015 | Aho et al. | |
| 9,026,728 B1 | 5/2015 | Xi et al. | |
| 10,748,568 B1 * | 8/2020 | Chahwan | G11B 21/12 |
| 10,943,620 B1 | 3/2021 | Vinson et al. | |
| 11,335,366 B2 | 5/2022 | Kawabe et al. | |
| 2007/0074083 A1 | 3/2007 | Olds et al. | |
| 2009/0244775 A1 | 10/2009 | Ehrlich | |
| 2011/0075290 A1 | 3/2011 | Hobbet | |

OTHER PUBLICATIONS

Anonymous, "Prevention of Adjacent Track Interference on HDDs," https://priorart.ip.com/IPCOM/000142898/Prevention-of-Adjacent-Track-Interference-on-HDDs, IPCOM000142898D, Nov. 9, 2006, 2 pages.

* cited by examiner

*Primary Examiner* — Nabil Z Hindi
(74) *Attorney, Agent, or Firm* — Calderon Safran & Wright P.C.

(57) ABSTRACT

Various illustrative aspects are directed to a data storage device, comprising one or more disks; an actuator mechanism configured to position a selected head among one or more heads proximate to a corresponding disk surface of the one or more disks; and one or more processing devices. The one or more processing devices are configured to detect adjacent track interference (ATI) due to a write operation in an adjacent sector to a subject sector on the corresponding disk surface; and to generate a readback servo trajectory for the subject sector, based on a position error signal (PES) for the subject sector, a PES for the adjacent sector, and the ATI.

20 Claims, 8 Drawing Sheets

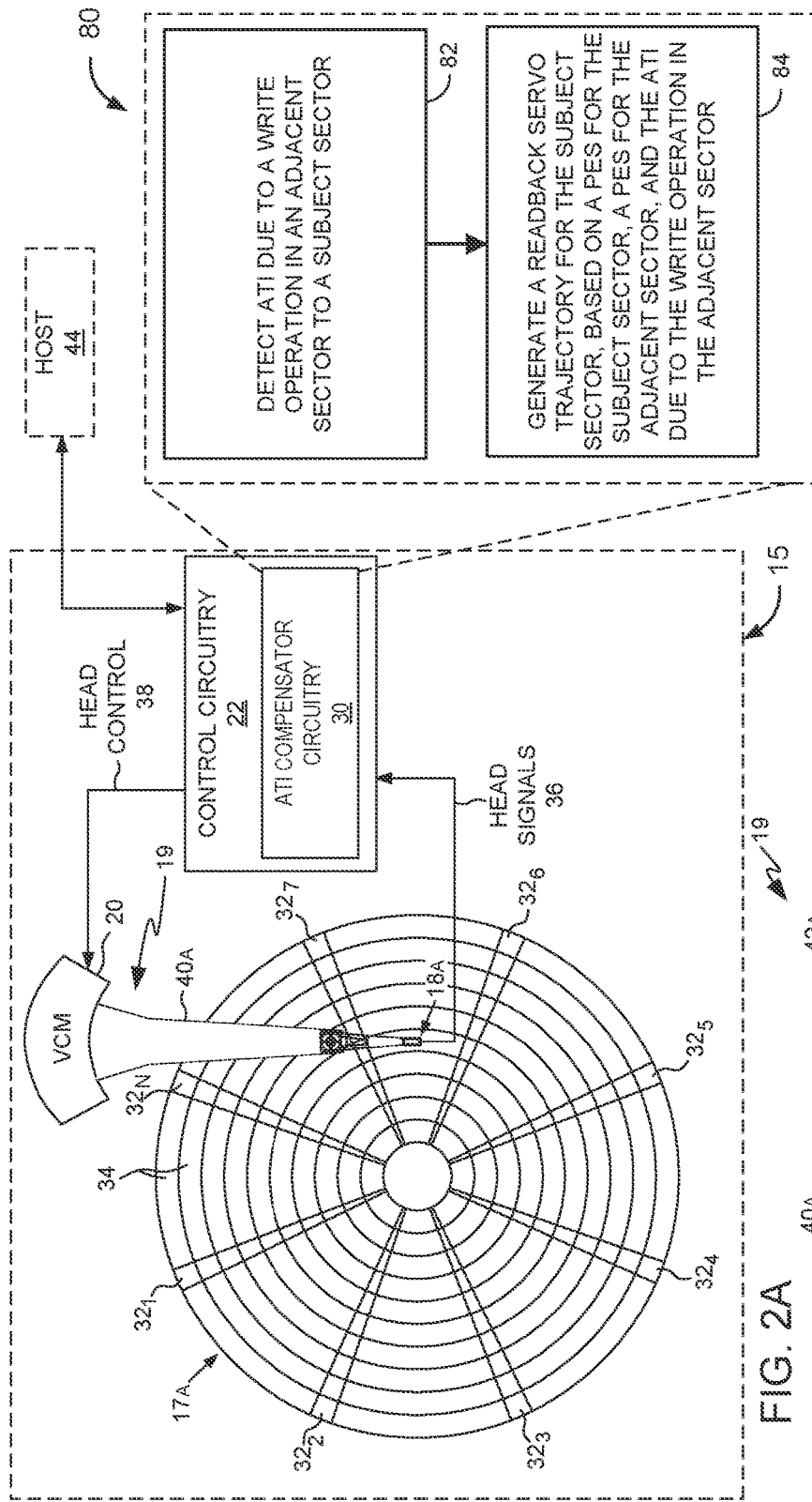
FIG. 2A
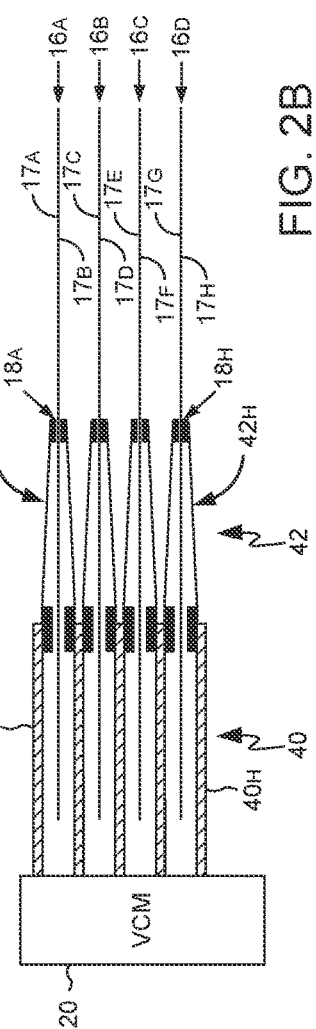
FIG. 2B
FIG. 2C

DATA STORAGE DEVICE WITH ADJACENT TRACK INTERFERENCE-AWARE SERVO TRAJECTORIES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES.

Writing new tracks adjacent to or otherwise near existing tracks can induce erosion or damage on the adjacent and other nearby tracks, a phenomenon known primarily as adjacent track interference (ATI). ATI from a track written adjacent to a subject track can affect the PES generated by the subject track.

SUMMARY

Various examples disclosed herein provide data storage devices such as hard disk drives with control circuitry that includes novel and inventive ATI erosion tracking per sector, and novel and inventive read trajectory navigation to update recorded readback positions for subsequent read operations of a subject sector as ATI erosion of the subject sector occurs, and to determine and navigate heads along paths of optimal signal-to-noise ratio (SNR) in context of potential ATI erosion in performing read operations, in accordance with aspects of the present disclosure. In conventional disk drives, data may sometimes be written off-track and/or become subject to ATI erosion, thereby degrading the read signal, potentially to the point of triggering data recovery process (DRP). In various examples of this disclosure, disk drive control circuitry may record a position error signal (PES) for each sector as it is written, store the PES data (e.g., in a non-volatile backing store), use the PES data to calculate ATI erosion when an eroded write and/or an eroding write is not centered on the track, update the position of a write as ATI erosion occurs, and define, generate, and store a readback servo trajectory along positions of determined optimal SNR in light of awareness of the determined ATI erosion. Control circuitry subsequently uses this generated readback servo trajectory for operating a head for performing future read operations of the subject track. Aspects of this disclosure may thus enable optimized read performance in disk drives impacted by ATI erosion.

ATI erosion to a track both reduces the best SNR available for the track, and causes the readback location of the best SNR available for the track to move away from the location where the data was originally written, moving it away from the side on which ATI erosion occurs. This movement can be substantial, e.g., potentially 20% of track pitch. By determining and updating the position of the best SNR available for the affected subject track as ATI erosion occurs to the track by a new write operation of an adjacent track, control circuitry may direct future read operations of the subject track at the optimal locations for the best SNR available for the subject track, which can provide a substantial boost to SNR of those future read operations of the subject track, relative to conventional read operations of the subject track centered on the conventionally recorded original position of the subject track. Defining the servo trajectory along track positions of determined optimal SNR for the subject track may maximize the probability of successfully reading the data of the subject track on the first attempt. Defining the servo trajectory along track positions of determined optimal SNR for the subject track may also provide the most relative SNR benefit for the most damaged sectors, which would otherwise be the hardest sectors to read.

The SNR benefit from defining the servo trajectory along track positions of determined optimal SNR for the subject track may result in increased ATI tolerance. Such increased ATI tolerance may be used or booked either for enhanced performance and reliability (e.g., decreased rare latency events), and/or for enabling improved ATI accounting and/or higher data track density, depending on the preferred performance criteria of a given data storage operating program.

In a recent example advance in conventional magnetic recording (CMR), disk drive control circuitry may record a PES for each write operation for the purpose of tracking ATI erosion impact. Specifically, U.S. Pat. No. 10,943,620B1, "Data storage device updating refresh metric based on quality of victim data track during write operation" issued Mar. 9, 2021 and assigned to common assignee, discloses such a method. However, in this prior art example of the '620 patent, such recorded PES for writes is not used as a servo trajectory on readback, and such recorded PES for writes is also not adjusted for subsequent ATI damage. Finally in this prior art example, in CMR, custom servo trajectories for read operations are only reserved for if a disk drive encounters serious read failures after numbers of unsuccessful attempts, and a specialized, laborious data recovery process (DRP) is triggered.

In aspects of the present disclosure, using a custom servo trajectory that reads at the location of maximum signal to noise ratio (SNR), taking into account ATI, may enable the best possible SNR on the first read operation, even for sectors that are significantly written off-track and/or subject to ATI erosion. Aspects of the present disclosure may thus minimize the likelihood that a read operation of any given sector fails, resulting in improved performance. Aspects of the present disclosure may thus also minimize the likelihood of experiencing read failures sufficient to require or trigger data a recovery process (DRP), thereby avoiding intervals of slow performance and delayed data retrieval inherent in DRP in conventional disk drives.

Various illustrative aspects are directed to a data storage device, comprising one or more disks; an actuator mechanism configured to position a selected head among one or more heads proximate to a corresponding disk surface among the one or more disks; and one or more processing devices. The one or more processing devices are configured to detect adjacent track interference (ATI) due to a write operation in an adjacent sector to a subject sector on the corresponding disk surface; and generate a readback servo trajectory for the subject sector, based on a position error signal (PES) for the subject sector, a PES for the adjacent sector, and the ATI.

Various illustrative aspects are directed to a method comprising detecting, with one or more processors, adjacent track interference (ATI) due to a write operation in an adjacent sector to a subject sector on a disk surface of a data storage device; and generating, with one or more processors, a readback servo trajectory for operating a head proximate to the subject sector, based on a position error signal (PES) for the subject sector, a PES for the adjacent sector, and the ATI.

Various illustrative aspects are directed to one or more processing devices comprising means for detecting adjacent track interference (ATI) due to a write operation in an adjacent sector to a subject sector on a disk surface of a data storage device; and means for generating a readback servo trajectory for operating a head proximate to the subject sector, based on a position error signal (PES) for the subject sector, a PES for the adjacent sector, and the ATI.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, including for detecting adjacent track interference (ATI) due to a write operation in an adjacent sector to a subject sector on a disk surface of a data storage device, and for generating a readback servo trajectory for operating a head proximate to the subject sector, based on a PES for the subject sector, a PES for the adjacent sector, and the ATI, in accordance with aspects of the present disclosure.

DETAILED DESCRIPTION

Figure 1:
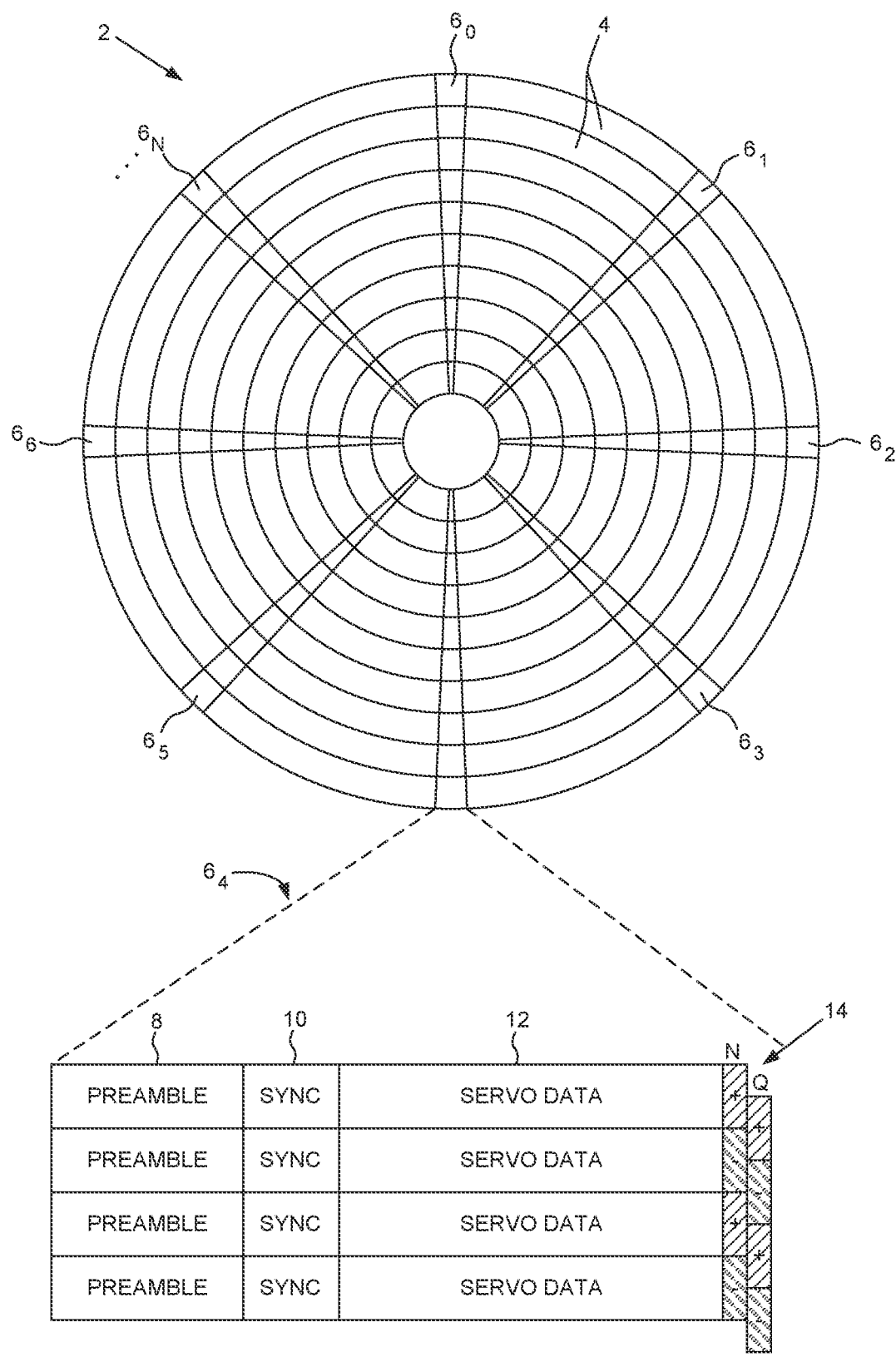
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises ATI compensator circuitry 30. FIG. 2C depicts a flowchart for an example method 80 that ATI compensator circuitry 30 of control circuitry 22 may perform or execute in controlling the operations of disk drive 15, in accordance with aspects of the present disclosure. Such aspects that ATI compensator circuitry 30 of control circuitry 22 may illustratively be configured to perform include operations and memory involved in tracking ATI erosion and ATI effects for and by individual tracks and sectors of the disk surfaces, in defining ATI-aware and SNR-optimized servo trajectories for controlling heads operating over or proximate to the disk surfaces, and in coordinating and managing between different servo control regimes, including per-sector-ID ("per-SID") servo control and ATI-aware servo trajectory control, and outputting inventive servo control signals and data to a servo controller/servo control processor of control circuitry 22, in accordance with example aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, ATI compensator circuitry 30 of control circuitry 22 may detect adjacent track interference (ATI) due to a write operation in an adjacent sector to a subject sector (82). ATI compensator circuitry 30 may further generate an ATI-aware readback servo trajectory for the subject sector, based on a stored PES for the subject sector, a stored PES for the adjacent sector, and the ATI due to the write operation in the adjacent sector to the subject sector (84).

ATI compensator circuitry 30 may further use the readback servo trajectory for the subject sector for performing a read operation of the subject sector. ATI compensator circuitry 30 may thus also function as servo trajectory navigation circuitry that defines a servo trajectory that compensates for ATI erosion and enhances or optimizes for read operation SNR, in ways beyond the capabilities of conventional PES navigation on a per-SID (per-sector-ID) basis, and thereby enable novel read performance and/or novel data track density, among other inventive advantages. Control circuitry 22, including ATI compensator circuitry 30, may further be configured to perform each of these steps and to perform additional actions, methods, and techniques, in accordance with various aspects including as further described herein.

As used herein, a "servo trajectory," unless otherwise specified, may generally refer to an ATI-aware readback servo trajectory for a subject sector based on the PES for the subject sector, the PES for the adjacent sector inducing the ATI on the subject sector, and the ATI due to the write operation in the adjacent sector to the subject sector, as determined, generated, and recorded by ATI compensator circuitry 30. A "servo trajectory" as generally used herein and as generated by ATI compensator circuitry 30 may thus generally refer to an ATI-aware readback servo trajectory generated by ATI compensator circuitry 30, and may generally be distinguished from a conventional track-center servo trajectory based on centerline tracking of servo track addresses and processing PES data. ATI compensator circuitry 30 may generate the readback servo trajectory such that the servo trajectory enables and yields an optimized SNR in light of the ATI erosion, which may generally be a higher SNR for the subject sector than the conventional, original default PES-based track-center servo trajectory for the subject sector, which a conventional disk drive may be configured to navigate based on the PES, e.g., using values from the servo addresses and PES alone for performing read operations of the subject sector, and without also being based on the ATI. ATI compensator circuitry 30 may thus be configured to generate the servo trajectory such that the servo trajectory yields a higher signal-to-noise ratio (SNR) for the subject sector, in various inventive examples of this disclosure, than using values from the servo addresses and PES for performing a read operation of the subject sector, as in conventional disk drives. As used herein, "PES-based trajectory" may generally refer to a track-center path or trajectory navigated conventionally using values from the servo addresses and PES for performing read operations of a subject sector.

As described herein, a "subject track" may be any track that is the subject of any write and/or read operation and may be considered to comprise subject sectors, which are inherently also subject to the same write and/or read operations. While ATI is largely discussed herein in terms of interference and erosion from a subsequent write of a track adjacent to a subject track, all techniques of this disclosure may apply equally to detecting ATI and determining, generating, and outputting ATI-aware servo trajectories due to track interference from tracks subsequently written at any relative position on the disk surface, whether an immediately adjacent track, a next track adjacent and on the opposing side of an immediately adjacent track, or any other track sufficiently proximate to a subject track to impose any physically possible effect on a subject track.

ATI compensator circuitry 30 may record a PES for each sector as it is written, and store the PES data, e.g., in a non-volatile memory component that functions as a backing store. ATI compensator circuitry 30 may then use the stored PES data to calculate ATI erosion when an eroded sector and/or an eroding write is not centered on the track, and calculate and determine new positions of optimal SNR for the affected sectors, based on the PES of the affected sectors, the PES of the newly written sector, and the ATI erosion caused by the newly written sector. ATI compensator circuitry 30 may thus update the recorded readback positions of an eroded sector as ATI erosion occurs due to a proximate write operation, and may thus define a servo trajectory along positions of determined optimal SNR in light of the determined ATI erosion. Control circuitry 22 may thereafter refer to the stored readback servo trajectory in performing read operations, and may thereby obtain an optimized SNR of the data in the sectors incorporating the impacts of ATI when performing read operations. Aspects of this disclosure may thus enable optimized read performance in the presence of ATI erosion.

Figure 3A:
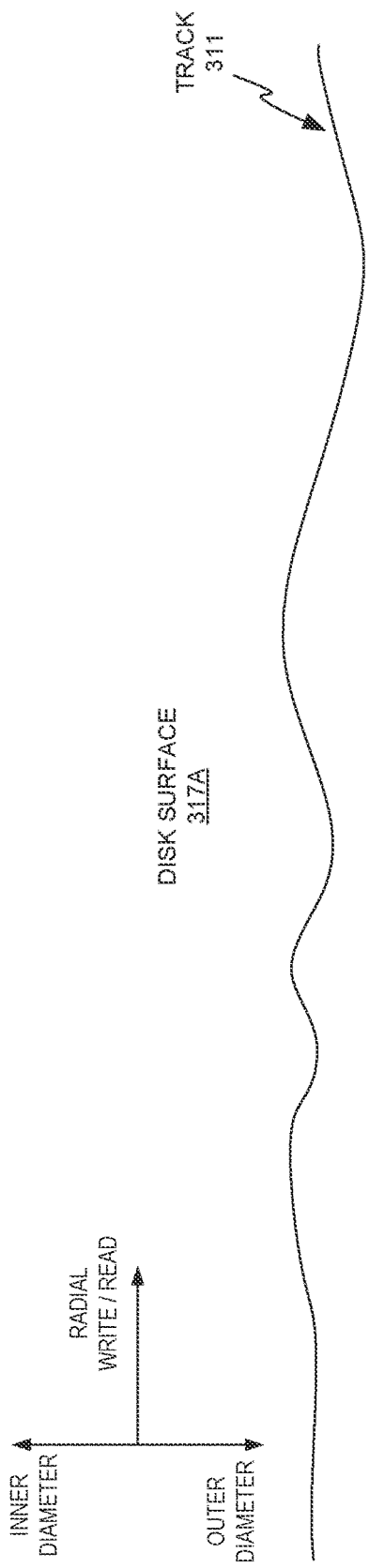
FIG. 3A illustrates a conceptual plan view of a subject track as originally written on its corresponding disk surface, with some variation in track position away from an ideal straight track, in accordance with various aspects of this disclosure.

FIG. 3A illustrates a conceptual plan view, looking down at disk surface 317A from perpendicular to disk surface 317A, of track 311 as originally written with a head 18 (not shown in FIG. 3A) on its corresponding disk surface 317A, with some variation, typical on a relevant scale, in track position away from an ideal straight track (ideally "straight" as measured on a local scale, and radial when considered on the macroscopic scale of the disk 16), in accordance with various aspects of this disclosure. Disk surface 317A is a disk surface 317 in a state after the write of track 311 and prior to any track being written adjacent to track 311.

Figure 3B:
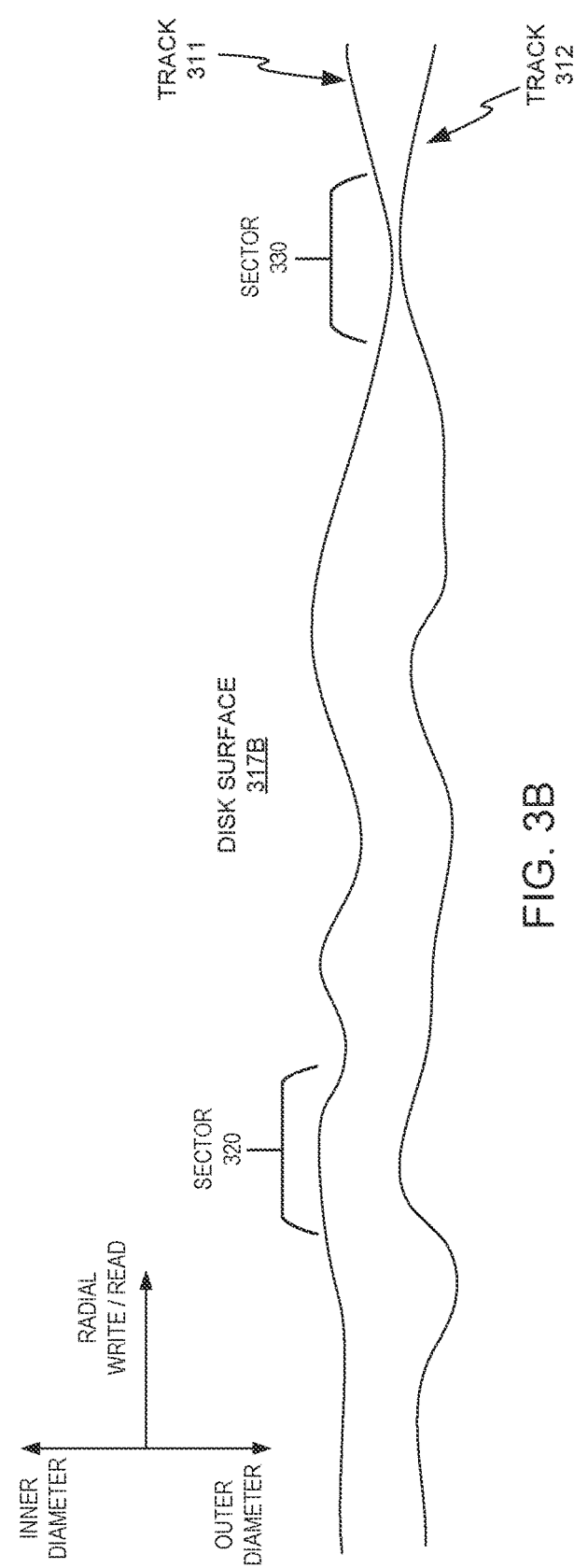
FIG. 3B illustrates a conceptual plan view of a new track subsequently written adjacent to the subject track, also with some variation in track position away from an ideal straight track, thereby inducing ATI on the subject track, and pushing the positions of actual maximum SNR laterally away from the new track in portions of the subject track, as well as reducing the maximum SNR in those portions of the subject track, in accordance with various aspects of this disclosure.

FIG. 3B illustrates a conceptual plan view of track 312 subsequently written adjacent to track 311, also with some variation in track position away from an ideal straight track, thereby inducing ATI on track 311, and pushing the readback positions with the actual maximum SNR laterally away from track 312 in portions of track 311, as well as reducing the maximum SNR in those portions of track 311, in accordance with various aspects of this disclosure. Track 312 is written on a right side (in the frame of reference of the write/read direction) or outer diameter side of track 311. As FIGS. 3A and 3B indicate, in the plan view, the radial read/write direction across disk surface 317A is toward the right side of the figure, and the inner diameter and outer diameter directions of disk surface 317A are upward and downward, respectively, in the frame of reference of the figure. Disk surface 317B is the same disk surface 317 in a new state after the write of track 312 adjacent to track 311, on the right side or outer diameter side of track 311. Further aspects of the present disclosure in the context of FIGS. 3A and 3B are illustrated in the further figures and further described with reference thereto.

Figure 3C:
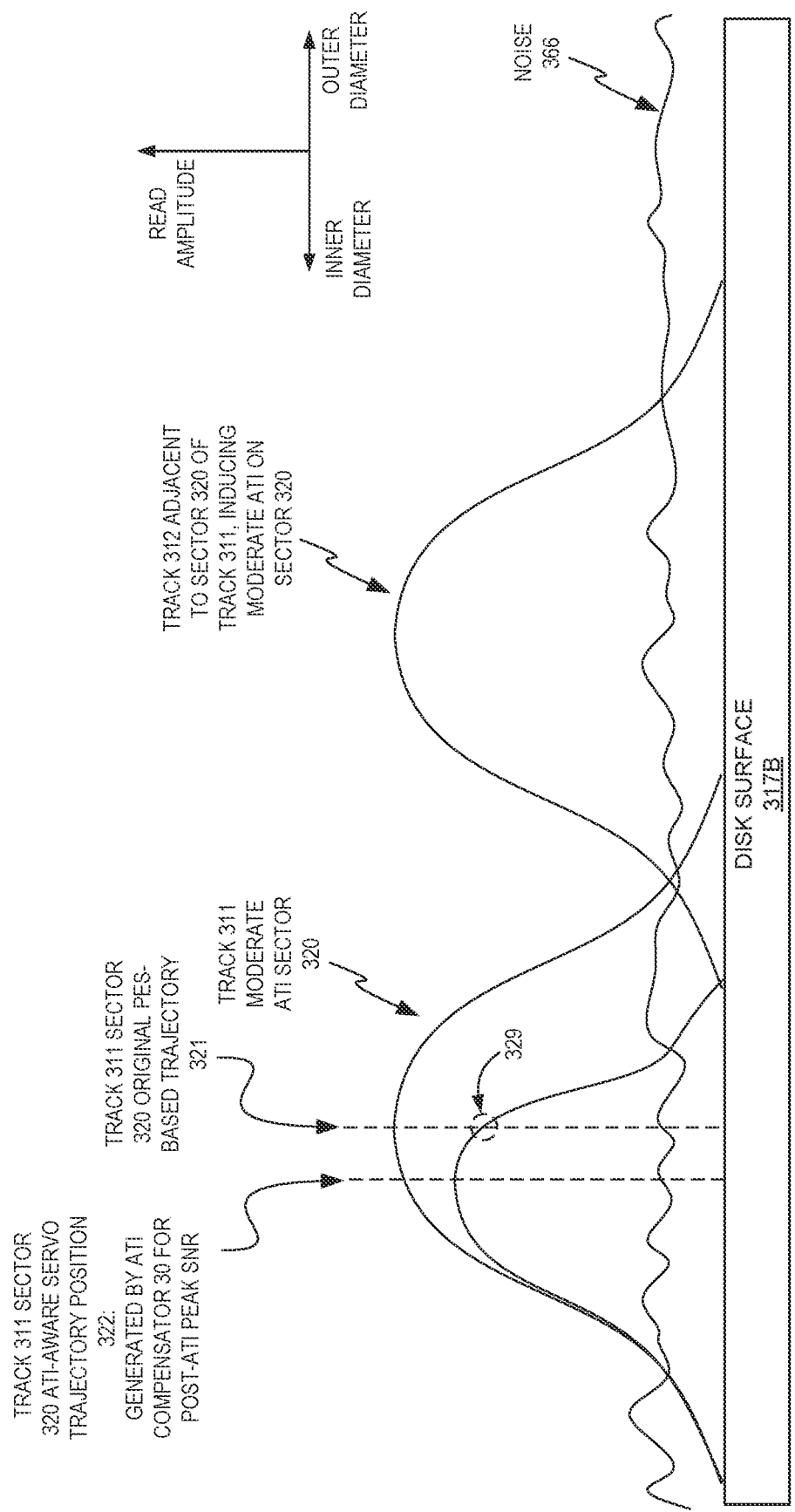
FIG. 3C illustrates a conceptual radial view of the subject track and the new track, in terms of their magnetic signal per lateral position on the disk surface, relative to noise, at the radial position of a sector of the subject track which is moderately affected by ATI, and of a new ATI-aware servo trajectory position for the subject track as generated by ATI compensator circuitry, in accordance with various aspects of this disclosure.

FIG. 3C illustrates a conceptual radial view, parallel to disk surface 317B in the write/read direction along disk surface 317B, of tracks 311 and 312, in terms of their magnetic signal per lateral position on the disk surface, relative to noise, as may be read by a read element of a head 18, at the radial position of sector 320 of track 311, which is moderately affected by ATI, and of a new ATI-aware servo trajectory position 322 for the subject track as generated by ATI compensator circuitry 30, in accordance with various aspects of this disclosure. Sector 320, as also shown in FIG. 3B, is a sector of track 311 moderately affected by ATI from subsequently written track 312. ATI compensator circuitry 30 may detect the actual path of newly written track 312 (e.g., from PES data for track 312) adjacent to sector 320 of track 311, and compare the path of newly written track 312 with the path of previously written track 311 (e.g., from stored PES data for track 311) at sector 320. ATI compensator circuitry 30 may then calculate and determine one or more new ATI-aware servo trajectory locations or positions 322 of a new readback path or trajectory of optimum SNR for previously written track 311 at sector 320, in this example, and generate or output ATI-aware servo trajectory position 322 as the position component for a servo trajectory for track 311 at sector 320, which is the radial position ATI compensator circuitry 30 determines has the post-ATI peak SNR for sector 320. ATI compensator circuitry 30 may thus direct control circuitry 22 to perform subsequent read operations of sector 320 of track 311 along ATI-aware servo trajectory position 322, instead of along the original, conventional PES-based trajectory position 321, in various examples.

Thus, at sector 320 of track 311, the original track PES-based trajectory position 321, with original peak SNR, is indicated at radial position 321, while ATI compensator circuitry 30 has determined and generated a new ATI-aware radial position with a new actual peak SNR for track 311 at sector 320 (in terms of peak read signal amplitude of track 311 at sector 320 over a local portion of effective ambient noise 366 from all noise sources in the read operation), subsequent to ATI erosion by the write of track 312 adjacent to sector 320, at new ATI-aware peak-SNR servo trajectory radial position 322. ATI compensator circuitry 30 accurately determines and generates the new peak-SNR ATI-aware servo trajectory radial position 322 of track 311 at a certain radial distance leftward or toward the inner diameter side of the original peak-SNR PES-based trajectory of track 311 at sector 320, away from track 312, in this example.

Besides the ATI-aware servo trajectory position 322 of post-ATI peak SNR being laterally displaced from position 321 of the original peak SNR, the peak SNR at sector 320 with ATI is significantly lower than the original peak SNR. The post-ATI SNR of position 321 of the original peak SNR (at the intersection 329 of the post-ATI amplitude signal curve with the dashed line of the position 321 of the original peak SNR, which may indicate the read signal amplitude that would conventionally be obtained at position 321) is lower still than the new post-ATI peak SNR at ATI-aware servo trajectory position 322. A conventional disk drive would target position 321 for a read operation, whereas control circuitry 22 comprising ATI compensator circuitry 30 in examples of this disclosure may target ATI-aware servo trajectory position 322 for a post-ATI read operation of sector 320 of track 311. A disk drive comprising ATI compensator circuitry 30 may thus achieve higher read performance than is possible in conventional disk drives, in various examples of this disclosure.

Figure 3D:
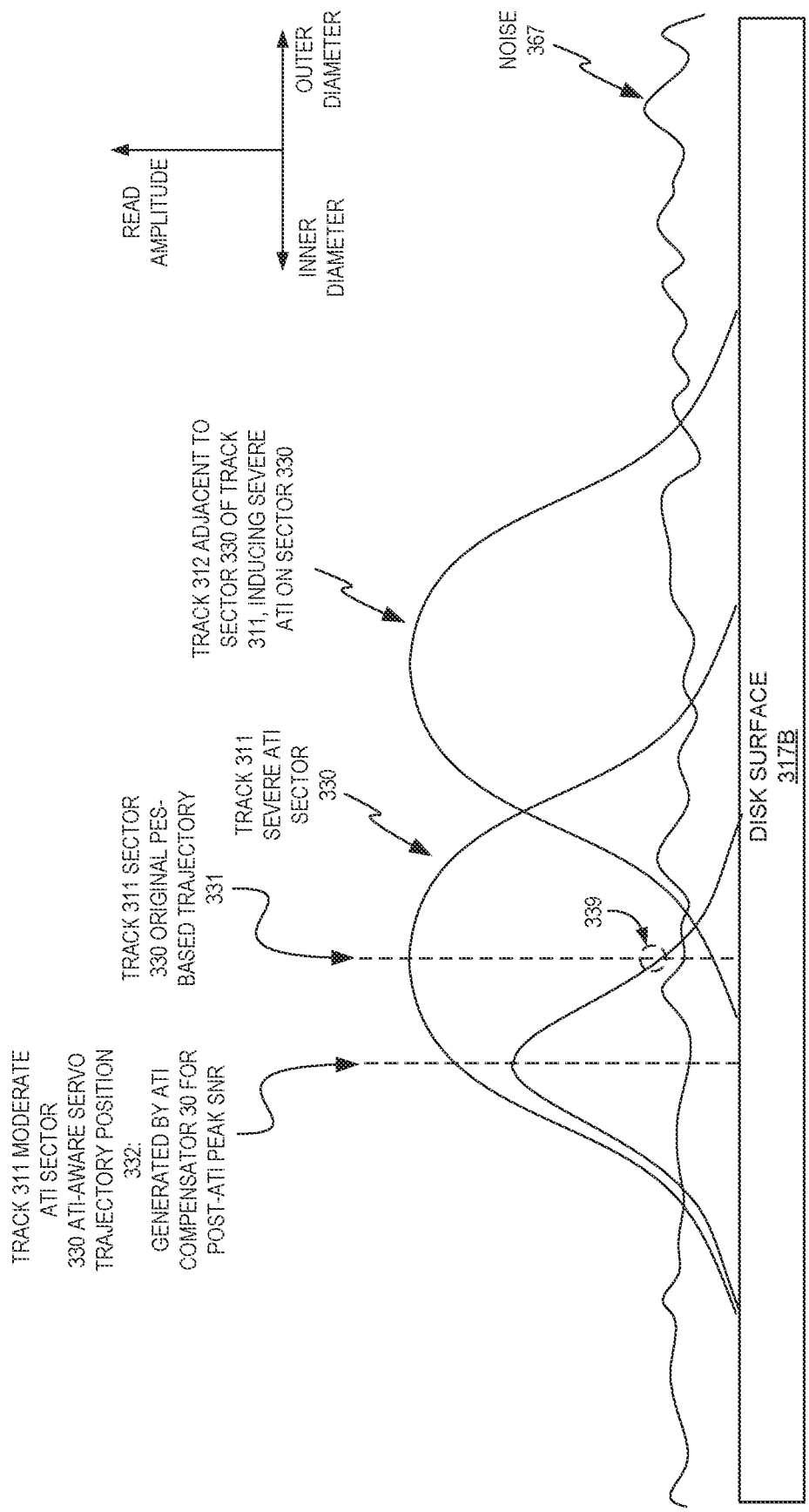
FIG. 3D illustrates a conceptual radial view of the subject track and the new track, in terms of their magnetic signal per lateral position on the disk surface, relative to noise, at the radial position of a sector of the subject track which is severely affected by ATI, and of a new ATI-aware servo trajectory position for the subject track as generated by ATI compensator circuitry, in accordance with various aspects of this disclosure.

FIG. 3D illustrates a conceptual radial view, parallel to disk surface 317B in the write/read direction along disk surface 317B, of tracks 311 and 312, in terms of their magnetic signal per lateral position on the disk surface, relative to noise, as may be read by a read element of a head 18, at the radial position of sector 330 of track 311, which is severely affected by ATI, and of a new ATI-aware servo trajectory position 332 for the subject track as generated by ATI compensator circuitry 30, in accordance with various aspects of this disclosure. Sector 330, as also shown in FIG. 3B, is a sector of track 311 severely affected by ATI from subsequently written track 312. ATI compensator circuitry 30 may detect the actual path of newly written track 312 (e.g., from PES data for track 312) adjacent to sector 330 of track 311, compare the path of newly written track 312 with the path of previously written track 311 (e.g., from stored PES data for track 311) at sector 330, and calculate and determine one or more new ATI-aware servo trajectory locations or positions 332 of a new path or trajectory of optimum SNR for reading back previously written track 311 at sector 330, in this example.

In different examples, ATI compensator circuitry 30 may detect the count of the number of occurrences of ATI of adjacent track 312, in combination with the proximity of ATI from each individual write of adjacent track 312 to subject sector 330, as part of generating a new ATI-aware servo position or trajectory for reading back subject sector 330.

With regard to determining ATI in terms of its proximity, ATI compensator circuitry 30 may detect if the path of the newly written track 312 is off-center from its ideal path and ideal displacement away from previously written track 311, and how far off-center it is in a direction toward or away from previously written track 311. The more off-center and the closer newly written track 312 is to previously written track 311 at sector 330 (taking into account the trajectory of the previously written track 311), the more impingement and the more ATI that ATI compensator circuitry 30 may determine newly written track 312 to induce on previously written track 311 at sector 330. The more off-center and the closer newly written track 312 is to previously written track 311 at sector 330, as ATI compensator circuitry 30 determines, the further the lateral displacement from its prior path that ATI compensator circuitry 30 may determine for a new peak SNR readback path of previously written track 311 at sector 330, on the opposite side of its prior path from newly written track 312. ATI compensator circuitry 30 may thus direct control circuitry 22 to perform subsequent read operations of sector 330 of track 311 along ATI-aware servo trajectory position 332, instead of along the original, conventional PES-based trajectory position 331, in various examples.

At sector 330 of track 311, the original track PES-based trajectory, with original peak SNR, is indicated at radial position 331, while ATI compensator circuitry 30 has determined and generated a new ATI-aware servo trajectory radial position 332 with a new actual peak SNR for track 311 at sector 330 (in terms of peak read signal amplitude of track 311 at sector 330 over a local portion of effective ambient noise 367), subsequent to ATI erosion by the write of track 312 adjacent to sector 330, at new peak-SNR ATI-aware servo trajectory radial position 332. ATI compensator circuitry 30 accurately determines and generates servo trajectory radial position 332 with the actual new post-ATI peak-SNR ATI-aware servo trajectory radial position 332 of track 311 at a certain radial distance leftward or toward the inner diameter side of the original peak-SNR PES-based trajectory 331 of track 311 at sector 330, away from track 312, in this example, and at a substantially greater distance from original peak-SNR PES-based trajectory radial position 331 than in the moderate ATI example of sector 320.

The post-ATI peak SNR is also even lower at sector 330, affected by severe ATI, than at sector 320, with moderate ATI. FIG. 3D shows that the SNR of sector 330 at position 331 of original peak SNR, which may be the conventional track PES-based trajectory of track 311 at sector 330 according to PES data (at the intersection 339 of the post-ATI signal amplitude curve of sector 330 with the dashed line of position 331 of original peak SNR, which may indicate the read signal amplitude that would conventionally be obtained at position 331), is a small fraction of the original SNR and is swamped by noise 367. A conventional disk drive following PES data would very likely be unable to read sector 330, or at least short of going into DRP mode and imposing very high latency times prior to recovering any data. On the other hand, control circuitry 22 comprising ATI compensator circuitry 30 in examples of this disclosure may target ATI-aware servo trajectory position 332 on the very first attempt of a post-ATI read operation of sector 330 of track 311, which may have an SNR of many multiples of the post-ATI SNR (of the read amplitude at intersection 339) at conventional track PES-based trajectory position 331, and may still successfully read sector 330 on the first attempt.

A disk drive comprising ATI compensator circuitry 30 may thus achieve higher read performance than is possible in conventional disk drives, in various examples of this disclosure. A disk drive comprising ATI compensator circuitry 30 may thus also enable tracks to be written more closely together and enable higher data density, or a combination of higher data density and faster more reliable read performance, in various examples of this disclosure.

Beyond the depicted examples of sectors 320 and 330, ATI compensator circuitry 30 may similarly determine new ATI-aware servo trajectory radial positions with the new actual peak SNR for track 311 at each sector of track 311 affected by ATI erosion by the write of track 312. ATI compensator circuitry 30 may similarly generate a new ATI-aware servo trajectory for up to the entirety of track 311, comprising new ATI-aware radial positions with the new actual peak SNR for track 311 at each of one or more sectors of track 311 affected by ATI erosion by the write of track 312.

While the examples above are discussed in terms of ATI compensator circuitry 30 determining a single ATI-aware peak-SNR position per sector of track 311, ATI compensator circuitry 30 may also determine ATI-aware peak-SNR servo trajectory positions for a subject track at any level of granularity, in different examples. ATI compensator circuitry 30 may also determine ATI-aware peak-SNR servo trajectory positions for a subject track at multiple positions per sector, for example.

ATI compensator circuitry 30 may indicate to other elements of control circuitry 22 involved in servo control and read operation head navigation that ATI compensator circuitry 30 has determined, defined, and recorded a new ATI-aware servo trajectory for track 311, which includes new peak-SNR ATI-aware servo trajectory positions 322 and 332 at sectors 320 and 330, respectively. ATI compensator circuitry 30 may output the new ATI-aware servo trajectory for track 311 to servo control circuitry of control circuitry 22 when control circuitry 22 performs a read operation of track 311.

Control circuitry 22 may perform a read operation of track 311 subsequent to the write of track 312, and as part of doing so, may retrieve or read the ATI-aware servo trajectory for track 311, and navigate head 18 proximate to disk surface 317B in accordance with the ATI-aware servo trajectory for track 311. Control circuitry 22 performing the read operation of track 311 in accordance with the ATI-aware servo trajectory for track 311 may thus achieve a higher and optimized SNR for the read operation of track 311 compared with performing the read operation by conventional means. Control circuitry 22 performing the read operation of track 311 in accordance with the ATI-aware servo trajectory for track 311 may achieve the best possible SNR, or reasonably and nominally close to the best possible SNR, for track 311 taking into account the impact of ATI on track 311, and may therefore also maximize the likelihood of achieving a successful read of the data encoded in track 311 on the first read operation attempt.

In ways such as these, control circuitry 22 performing the read operation of track 311 in accordance with the ATI-aware servo trajectory for track 311 may achieve higher read performance than is possible in the conventional art. Such higher ATI-tolerant read performance may provide the most relative benefit for the most ATI-damaged tracks, which may otherwise be an outsized contributor to latency and read failures, in various examples. Such higher ATI-tolerant read performance may be applied in various ways to serve one or more of multiple performance criteria, such as higher read reliability, faster average read times, higher data track density in the context of significant ATI impacts, and/or other design goals, in various examples.

Control circuitry 22 may be configured to store, in response to a write operation of one or more sectors of a track, the PES for each of the sectors in that track, at nominally the same time as or in association with the write operation of that subject track. Control circuitry 22 may record the PES values for each of the subject sectors in that subject track in a non-volatile memory component, in various examples. Control circuitry 22 may subsequently write to a sectors of a track adjacent to that previously written subject track. In this case, control circuitry 22 may have stored the PES values for each of the sectors in that subject track prior to the write operation in the adjacent sectors, that is, the sectors of the adjacent track.

ATI compensator circuitry 30 may also decrease the difference between single-sided and double-sided ATI, which may thereby further improve ATI accounting and further reduce effective ATI erosion levels in data read operations, in various aspects of this disclosure. To this end, ATI compensator circuitry 30 may include two bits per sector in a data store, e.g., in a non-volatile memory component, indicating whether subsequent adjacent tracks have been written adjacent to a subject track either only on one side of the subject track or on both sides of the subject track, in addition to the position information for the sectors of the subject track. That is, ATI compensator circuitry 30 may be configured to detect a second ATI due to a write operation in an adjacent sector on a second side of the subject sector, on the other side from the first or initial or prior ATI. ATI compensator circuitry 30 may be configured to generate a modified servo trajectory for the subject sector based on the initial or other prior readback servo trajectory, the PES of the second adjacent sector, and the second ATI. The initial readback servo trajectory was itself based on the initial PES data and the first ATI, such that ATI compensator circuitry 30 thus determines and generates the modified servo trajectory based on the initial PES data for the eroded subject sector and for the first and second ATI erosion-inducing adjacent sectors, the first ATI, and the second ATI, in various examples. ATI compensator circuitry 30 may continue to iteratively generate further new readback servo trajectories as needed in response to further occurrences of ATI from adjacent or proximate tracks, in which case the newly prior readback servo trajectory is the updated "initial" readback servo trajectory, for purposes of this description, which ATI compensator circuitry 30 may use in generating the latest new readback servo trajectory.

ATI compensator circuitry 30 may be configured to designate two bits per subject sector in a data store, such as in a non-volatile memory component, for indicating whether ATI has been detected on the first side and on the second side of the subject sector. For example, ATI compensator circuitry 30 may be configured to use one of each of the two bits per sector to flag whether ATI has been induced on the subject sector from a write operation in a track to the left or right side of the subject track, or to the inner diameter side or the outer diameter side of the subject track.

FIGS. 3E-3H depict conceptual views of successive ATI erosion to a subject sector 340 from repeated writes to an adjacent sector, which may be successfully mitigated by ATI compensator circuitry 30, in aspects of this disclosure. The number of successive writes to an adjacent sector is typically a substantial contributor to ATI erosion of the subject sector, in addition to and potentially more substantial than proximity of a single write of the adjacent sector. Subject sector 340 is shown in different states, due to successive ATI from successive writes of the adjacent sector in the adjacent track on one side, as sector 340A at a time 2 in FIG. 3E, sector 340B at a time 3 in FIG. 3F, and sector 340C at a time 4 in FIG. 3G.

Figure 3E:
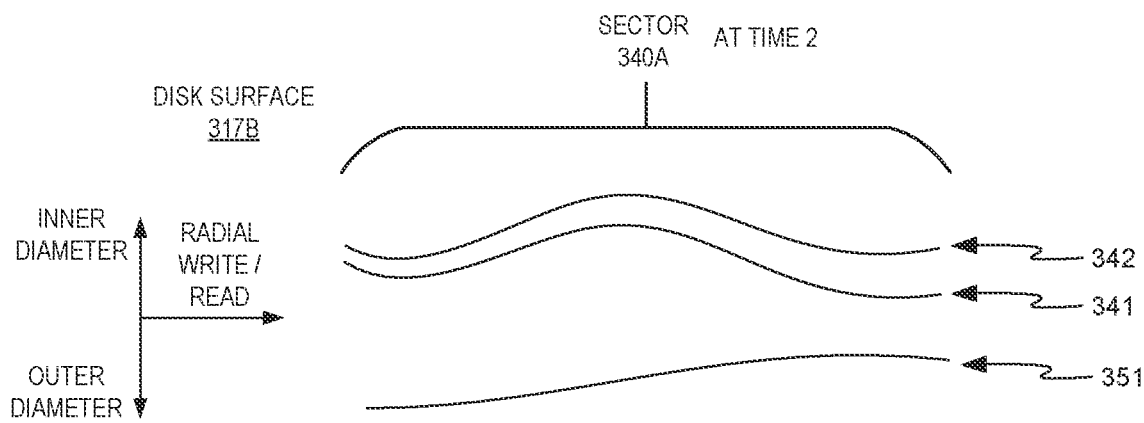
FIG. 3E depicts a conceptual top plan view of an initial subject sector PES-based trajectory of a subject sector after an initial write of the subject sector at a time 1, a subsequently written adjacent sector write trajectory of an adjacent sector, and a new, second subject sector peak-SNR ATI-aware servo trajectory of the subject sector, in accordance with various aspects of this disclosure.

FIG. 3E depicts a conceptual top plan view of an initial subject sector PES-based trajectory 341 of subject sector 340 after an initial write of subject sector 340 at a time 1, subsequently written adjacent sector write trajectory 351 of an adjacent sector, and a new, second subject sector peak-SNR ATI-aware readback servo trajectory 342 of subject sector 340 (thus in its new, second state as subject sector 340A at a time 2). ATI compensator circuitry 430 may determine and generate the new, second subject sector peak-SNR ATI-aware readback servo trajectory 342, subsequent to detecting the ATI from the write of adjacent sector write trajectory 351 of the adjacent sector, for subsequent reads of subject sector 340.

Figure 3F:
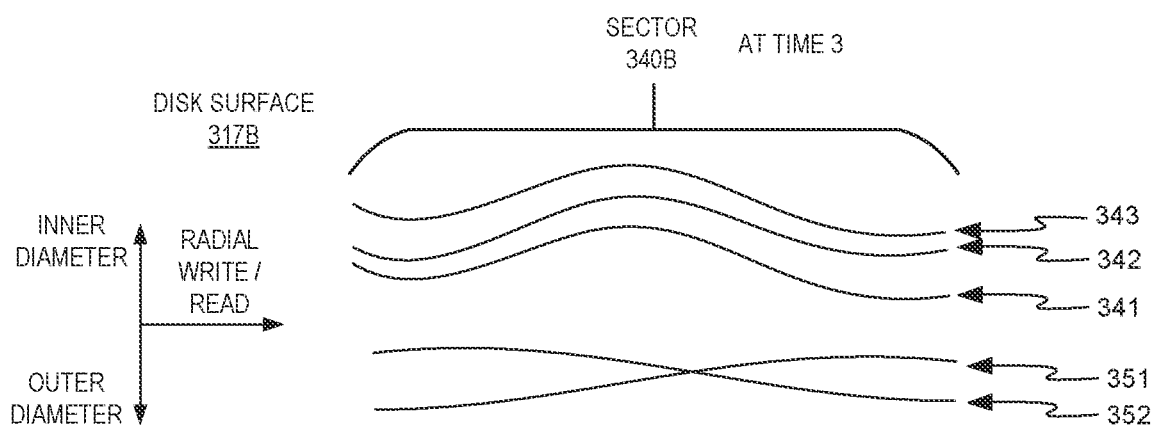
FIG. 3F depicts a conceptual top plan view of an initial subject sector PES-based trajectory, a subsequently written adjacent sector write trajectory of the adjacent sector, a second subject sector peak-SNR ATI-aware servo trajectory, a second subsequently written adjacent sector write trajectory of the same adjacent sector, and a new, third subject sector peak-SNR ATI-aware servo trajectory of the subject sector 340, in accordance with various aspects of this disclosure.

FIG. 3F depicts a conceptual top plan view of initial subject sector PES-based trajectory 341, subsequently written adjacent sector write trajectory 351 of the adjacent sector, second subject sector peak-SNR ATI-aware readback servo trajectory 342, a second subsequently written adjacent sector write trajectory 352 of the same adjacent sector, and a new, third subject sector peak-SNR ATI-aware readback servo trajectory 343 of subject sector 340 (thus in its new, third state as subject sector 340B at a time 3). ATI compensator circuitry 430 may thus determine and generate the new, third subject sector peak-SNR ATI-aware readback servo trajectory 343, subsequent to detecting the ATI from the write of adjacent sector write trajectory 352 of the adjacent sector, for subsequent reads of subject sector 340.

Figure 3G:
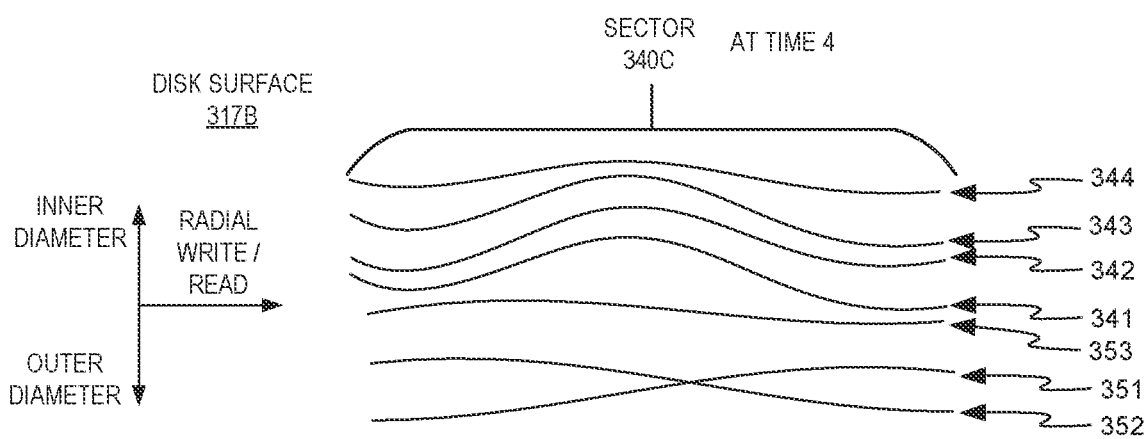
FIG. 3G depicts a conceptual top plan view of a first three subject sector PES-based ATI-aware servo trajectories, a first two subsequently written adjacent sector write trajectories, a third subsequently written adjacent sector write trajectory of the same adjacent sector, and a new, fourth subject sector peak-SNR ATI-aware servo trajectory of the subject sector, in accordance with various aspects of this disclosure.

FIG. 3G depicts a conceptual top plan view of the first three subject sector PES-based ATI-aware servo trajectories 341, 342, 343, the first two subsequently written adjacent sector write trajectories 351 and 352, then a third subsequently written adjacent sector write trajectory 353 of the same adjacent sector, and a new, fourth subject sector peak-SNR ATI-aware readback servo trajectory 344 of subject sector 340 (thus in its new, fourth state as subject sector 340C at a time 4). ATI compensator circuitry 430 may thus, yet again, determine and generate the new, fourth subject sector peak-SNR ATI-aware readback servo trajectory 344, or subsequent to detecting the ATI from the write of adjacent sector write trajectory 353 of the adjacent sector, and store the new ATI-aware readback servo trajectory 344 for subsequent reads of subject sector 340.

Figure 3H:
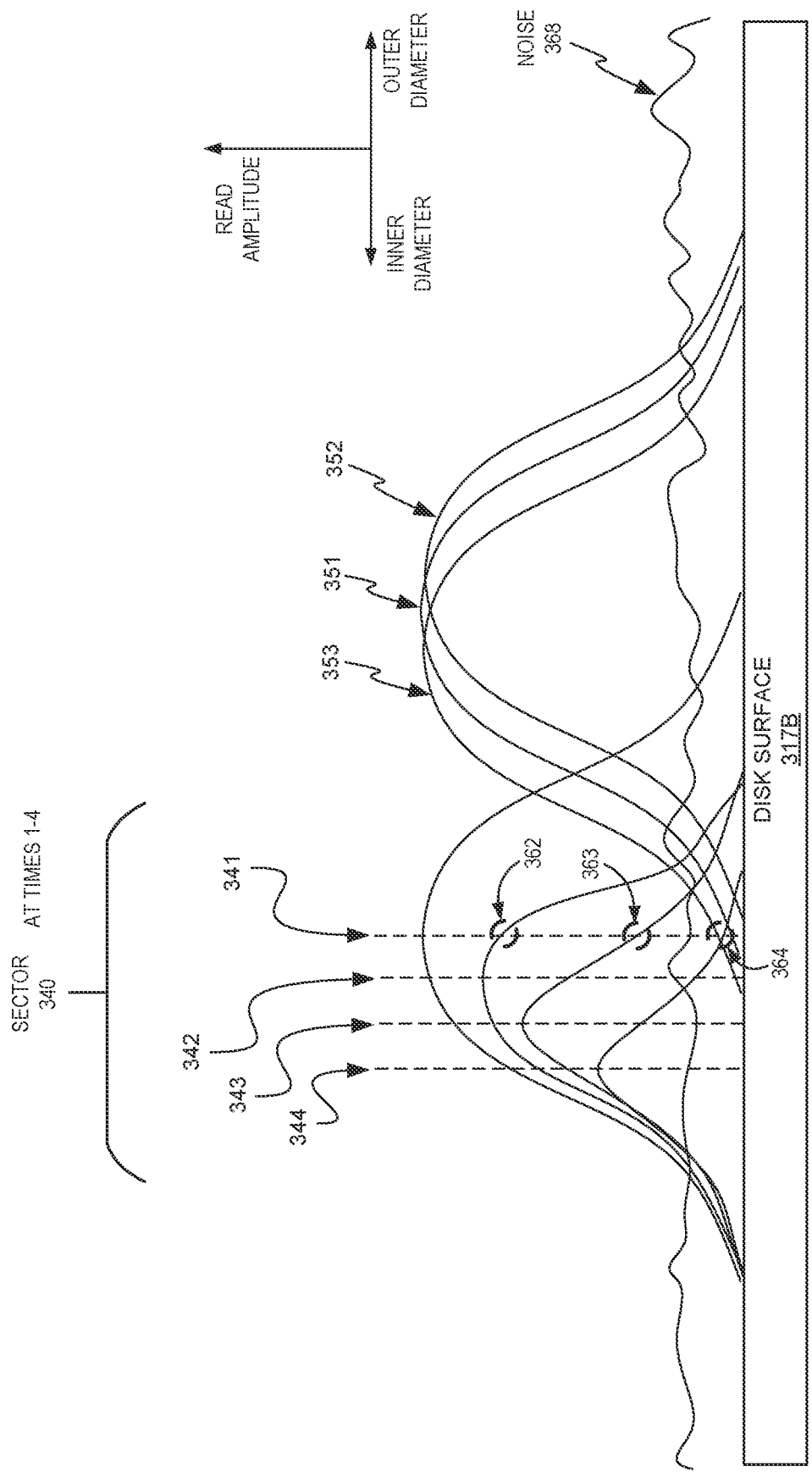
FIG. 3H depicts a conceptual radial cross-section view of a subject sector and its adjacent sector writes at times 1-4, showing amplitude per radial displacement curves for an original sector PES-based trajectory of the subject sector at time 1 prior to ATI; each adjacent sector write at its respective time of write; and subject sector post-ATI peak-SNR ATI-aware servo trajectories with actual peak SNR for the subject sector at their respective times 2-4, after each infliction of ATI erosion from the adjacent sector writes, in accordance with various aspects of this disclosure.

FIG. 3H depicts a conceptual radial cross-section view of subject sector 340 and its adjacent sector writes at times 1-4, showing amplitude per radial displacement curves for the original sector PES-based trajectory 341 of sector 340 at time 1 prior to ATI; each adjacent sector write 351-353 at its respective time of write; and each subject sector post-ATI peak-SNR ATI-aware servo trajectories 342-344 with actual peak SNR for sector 340 at their respective times 2-4, after each infliction of ATI erosion from the adjacent sector writes 351-353. FIG. 3H also shows ambient all-source noise 368, and conventional read amplitude intersections 362, 363, and 364 of the original sector PES-based trajectory 341 of sector 340 with the actual up-to-date amplitude curves of subject sector ATI-aware servo trajectories 342, 343, 344, at their respective times that ATI compensator circuitry 430 determines and stores them.

ATI compensator circuitry 430 may iteratively determine and store each of ATI-aware servo trajectories 342-344 based on both the PES and ATI for each adjacent sector write 351-353, respectively, after each adjacent sector write 351-353 is written. In response to the write operation for the second adjacent sector write 352, ATI compensator circuitry 430 determines and stores ATI-aware readback servo trajectory 343 based on both the PES and ATI for both of the accumulated adjacent sector writes 351 and 352. In response to the write operation for the third adjacent sector write 353, ATI compensator circuitry 430 determines and stores ATI-aware servo trajectory 344 based on the PES and ATI for all of the accumulated adjacent sector writes 351, 352, and 353. In various examples, control circuitry 22 may increment an ATI counter for each write operation for each adjacent sector write 351-353, and ATI compensator circuitry 430 may perform each iteration of determining and storing a new ATI-aware servo trajectory for sector 340 in response to each incrementing of the ATI counter for the adjacent sector (or for either adjacent sector on either side of sector 340). While each individual adjacent sector write 351-353 and potentially further adjacent sector writes would potentially have a certain effect on the SNR profile of subject sector 340, ATI compensator circuitry 430 may determine and store new ATI-aware servo trajectories, at each stage, based on both the PES of and ATI due to the sum total of the accumulated adjacent sector writes. This determination based on PES and ATI of an entirety of accumulated adjacent sector writes may be substantially different, and more accurate, than a determination based only on a most recent adjacent sector write, in various examples.

By way of comparison, a conventional disk drive would attempt to read the conventional PES-based trajectory 341 of sector 340 regardless of ATI and would thus read the read amplitudes at amplitude intersections 362, 363, and 364 of the original sector write ATI-aware servo trajectory 341 of sector 340 after times 2, 3, and 4, respectively, without regard to or awareness of ATI erosion subsequent to the initial write of sector 340. As FIG. 3H shows, conventional read amplitude 362 of subject sector ATI-aware servo trajectory 342, after one instance of ATI erosion, is significantly below nominal read amplitude. Conventional read amplitude 363 of subject sector ATI-aware servo trajectory 342, after a second instance of ATI erosion, is close to noise 368, and may likely be impossible for a conventional disk drive to read without going into the onerous DRP mode. Conventional read amplitude 362 of subject sector ATI-aware servo trajectory 342, after a third instance of ATI erosion, is deeply engulfed in noise 368 and may be strictly impossible for a conventional disk drive to read or recover. On the other hand, as FIG. 3H shows, the successive post-ATI maximum SNR sector ATI-aware servo trajectories 342, 343, 344, which ATI compensator circuitry 430 determines and stores, in examples of this disclosure, may enable the maximum physically possible chance to successfully read sector 340 after each instance of ATI erosion, and may enable successful reads of sector 340 after each instance of ATI erosion.

In other examples, the disk drive may also make adjacent writes to the adjacent sector on the opposing side of sector 340, and to both sides of sector 340 (i.e. to the left/inner diameter side and to the right/outer diameter side), in any order. In these cases, ATI compensator circuitry 430 may detect each instance of ATI from either side of sector 340, and generate a new ATI-aware servo trajectory for sector 340 in each instance, taking into account the cumulative ATI erosion from either side, in each instance, in different examples. These successive new peak-SNR ATI-aware servo trajectories for sector 340 may alternate between leftward and rightward (in the frame of reference of the write and read direction, i.e., toward the inner diameter and outer diameter) from each previous peak-SNR ATI-aware servo trajectory, depending on to which side of sector 340 each new adjacent sector write occurs. Control circuitry 22 may also perform ATI refresh writes to increase the peak SNR of an ATI-eroded sector, particularly after a number of successive instances of ATI erosion.

Figure 4:
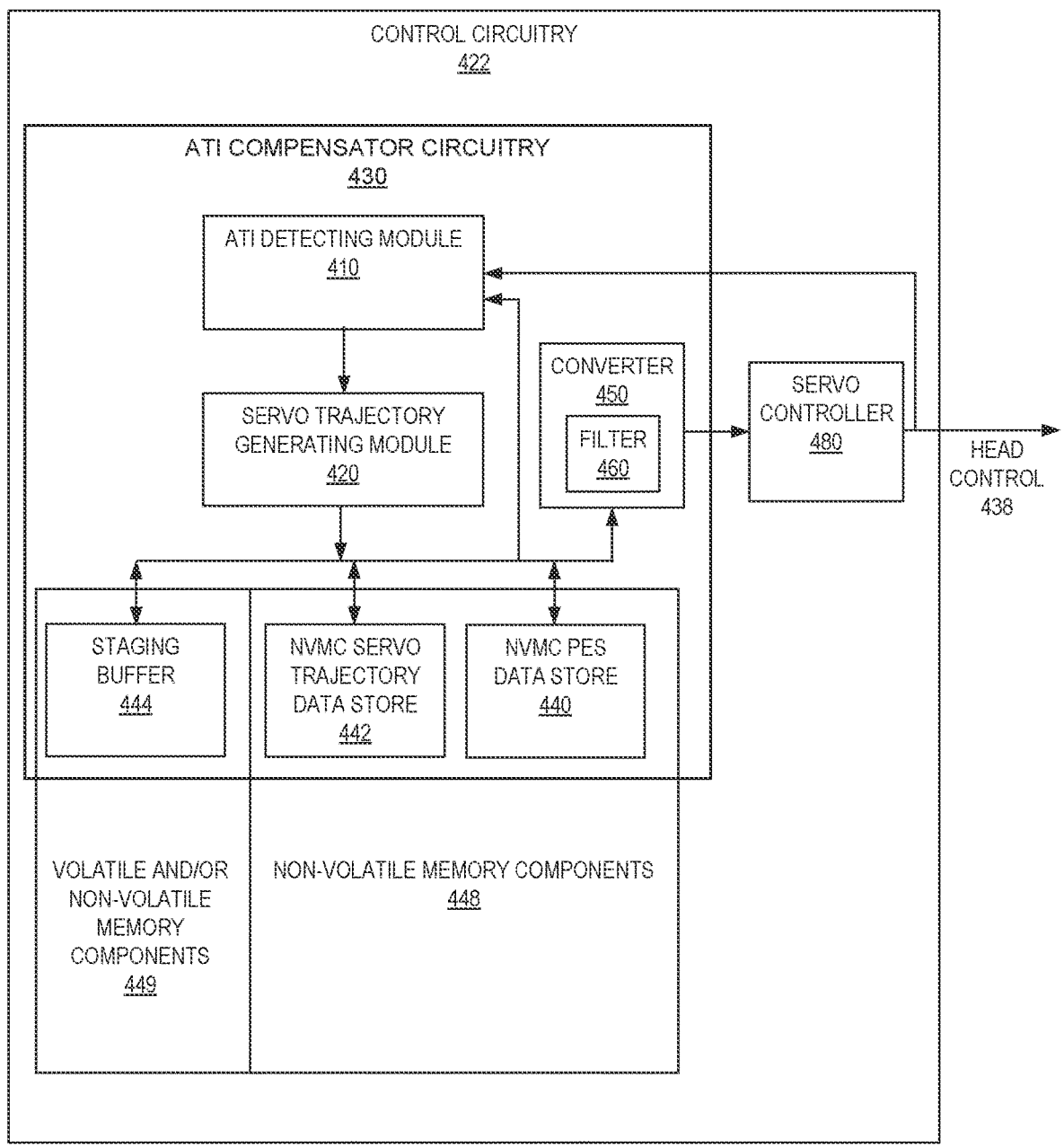
FIG. 4 depicts a conceptual block diagram of control circuitry comprising ATI compensator circuitry, in accordance with aspects of this disclosure.

FIG. 4 depicts a conceptual block diagram of control circuitry 422 comprising ATI compensator circuitry 430, in aspects of this disclosure. Control circuitry 422 comprising ATI compensator circuitry 430 are an example implementation of control circuitry 22 and ATI compensator circuitry 30 as shown in FIGS. 2A-2C and as described above with reference thereto. ATI compensator circuitry 430 includes ATI detecting module 410, servo trajectory generating module 420, staging buffer 444, non-volatile memory component (NVMC) PES data store 440, NVMC servo trajectory data store 442, and converter 450.

ATI detecting module 410 detects and/or determines ATI and ATI erosion due to write operations in tracks adjacent to previously written subject tracks, as described above (e.g., 82 in FIG. 2C). Servo trajectory generating module 420 generates, in response to ATI detecting module 410 detecting ATI, servo trajectories for subject sectors, based on PES data for the subject sectors and on the detected and/or determined ATI from the subsequently written adjacent sectors onto the subject sectors, as described above (e.g., 84 in FIG. 2C). ATI detecting module 410 and servo trajectory generating module 420 may either be separate modules, elements, or components as conceptually depicted in FIG. 4 or may be partly or entirely integrated in a single, unified module, element, or component, in various examples.

Control circuitry 422 comprises non-volatile memory component 448, portions of which ATI compensator circuitry 430 uses to implement NVMC PES data store 440 and NVMC servo trajectory data store 442, and portions of which control circuitry 422 may use for other functions. Converter 450 comprises a filter 460, which may be a low-pass filter, in some examples.

Control circuitry 422 also comprises a servo controller 480. Servo controller 480 may output head control signals 438, analogous to head control signals 38 as shown in FIG. 2A and described with reference thereto. Servo controller 480 may control the initial writing of tracks in accordance with PES data. In some examples, ATI compensator circuitry 430 may receive and store PES data from servo controller 480, and may store servo trajectory data (e.g., data on the servo trajectories), in a backing store implemented in non-volatile memory component 448, which may be written cycle limited. ATI compensator circuitry 430 may output servo trajectory signals to servo controller 480 for performing read operations of tracks affected by ATI erosion, in aspects of this disclosure.

ATI compensator circuitry 430 may use staging buffer 444 to group updates to the servo trajectory data together in NVMC servo trajectory data store 442 in non-volatile memory component 448. A plurality of subject sectors may be included in a subject track, and ATI compensator circuitry 430 may be configured to store respective servo trajectories for the plurality of subject sectors comprised in the subject track, first in staging buffer 444, and then in the backing store of NVMC servo trajectory data store 442 implemented in non-volatile memory component 448. In this way, ATI compensator circuitry 430 may be enabled to subsequently retrieve some or all of the servo trajectories of a single subject track, in order, with a single read of NVMC servo trajectory data store 442 in non-volatile memory component 448. Thereby, ATI compensator circuitry 430 may be configured to store the respective servo trajectories for a plurality of subject sectors comprised in a subject track from staging buffer 444 to a contiguously readable block in NVMC servo trajectory data store 442 in non-volatile memory component 448, in various examples. In various examples, staging buffer 444 may comprise any kind of memory component.

ATI compensator circuitry 430 may comprise a system to indicate which tracks have had writes subsequent to the most recent updating of the servo trajectory data in NVMC servo trajectory data store 442 in non-volatile memory component 448, in various examples. For example, ATI compensator circuitry 430 may comprise a bit array with one bit per track indicating which tracks have had writes subsequent to the most recent updating of the servo trajectory data in NVMC servo trajectory data store 442 in non-volatile memory component 448. Thus, ATI compensator circuitry 430 may, in some examples, be configured to record an indication of whether a subject track that comprises a subject sector has been subject to new write operations in one or more further sectors of the subject track subsequent to generating the servo trajectory for the subject sector, and to perform an operation in response to the subject track having been subject to a new write operation in one or more further sectors of the subject track subsequent to generating the servo trajectory for the subject sector.

ATI compensator circuitry 430 may use any of various techniques to address tracks with that bit set. For example, for a track with that bit set, ATI compensator circuitry 430 may refrain from using the servo trajectories from NVMC servo trajectory data store 442 in non-volatile memory component 448, and may instead use PES data for that track (e.g., by signaling servo controller 480 to use PES data for performing a read operation of that track, or by refraining from outputting a servo trajectory to servo controller 480, which may then default to using PES data for reading that track). Thus, in some examples, ATI compensator circuitry 430 may be configured, in response to the subject track having been subject to a new write operation in one or more further sectors of the subject track subsequent to generating the servo trajectory for the subject sector, to use conventional PES values for a read operation of the subject track.

In another example, for a track with that bit set, ATI compensator circuitry 430 may generate a new, modified servo trajectory based on data contained in staging buffer 444 for that track as well as the servo trajectory for that track as previously stored in NVMC servo trajectory data store 442 in non-volatile memory component 448. This may enable using both the stored servo trajectory and updated data from staging buffer 444, such that the new, modified servo trajectory may enable a more accurate following of the updated trajectory of highest SNR for a read operation of the affected sectors of the track. Thus, in some examples, ATI compensator circuitry 430 may be configured, in response to the subject track having been subject to new write operations in one or more further sectors thereof subsequent to generating the servo trajectory for the subject sector, to generate a servo trajectory, for the subject track, using both data from a staging buffer on the write operation in the one or more further sectors of the subject track, and the servo trajectory for the subject sector from a non-volatile memory component.

As shown, ATI compensator circuitry 430 may implement staging buffer 444 in any form of volatile and/or non-volatile memory components 449, in different examples. ATI compensator circuitry 430 may comprise and implement memory components that are intrinsically and traditionally volatile but that ATI compensator circuitry 430 may implement as power-protected volatile memory that behaves and functions like non-volatile memory for all practical purposes. ATI compensator circuitry 430 may use internal, failover, and/or redundant power sources to implement such power-protected volatile memory. For example, control circuitry 422 may be configured to detect any loss of external and/or nominal power, and in response, use the spindle motor back EMF of the disk drive as a backup generator power source to power transfer of all data from one or more volatile memory components to one or more non-volatile memory components. The disk drive and control circuitry 422 may be configured with at least enough such backup power capacity to transfer the entire memory capacity of any or all volatile memory components to non-volatile memory, in various examples. Control circuitry 422 may also use other backup power sources in other examples. ATI compensator circuitry 430 may thus blur the lines between volatile and non-volatile memory components, in various examples. ATI compensator circuitry 430 may implement one or more staging buffers in one or more power-protected dynamic random-access memory (DRAM) components, and combine the cost and performance of DRAM with the power protection of effectively non-volatile memory, in various examples. ATI compensator circuitry 430 may also implement a staging buffer in any form or combination of one or more volatile, power-protected volatile, and non-volatile memory components, in various examples.

In some examples, one or more discontinuities in servo trajectories may arise for a sector, internally to a sector and/or from one sector to another in a track. Such discontinuities may occur as a result of multiple disk writes, with different write trajectories, and/or uneven ATI erosion, for example. In these cases, ATI compensator circuitry 430 may be configured to detect a discontinuity (e.g., one or more position discontinuities) in a nominal or desired or ideal or highest SNR trajectory between a subject sector and a previous sector and/or a following sector in the subject track. For example, a discontinuity in nominal trajectory between the subject sector and a previous sector or a following sector may result because the sectors weren't written at the same time, and had different write position errors on the different writes, and/or because one or more of the sectors have been subject to subsequent ATI that moved the residual sideways, while other sectors in sequence in the subject track were not subject to that subsequent ATI or were differentially subject to it. Further, in response to a discontinuity in nominal trajectory between the subject sector and a preceding or following sector in the subject track, ATI compensator circuitry 430 may be configured to apply a filter 460 to the servo trajectory for the subject sector, such as a low-pass filter, or a similar filter, to the resulting servo trajectory. Filter 460 may or may not be comprised in converter 450 in different examples. Applying filter 460 to the servo trajectory for the subject sector in this way may provide a "middle ground" in the event of the discontinuity for the subject sector.

In some such examples, ATI compensator circuitry 430 may apply filter 460 to the servo trajectory for the one or more sectors comprising or affected by the discontinuity as part of generating and outputting a servo trajectory control signal to servo controller 480 of control circuitry 422. This may include converter 450 converting the servo trajectory control signal from the servo trajectory as stored in NVMC servo trajectory data store 442 in non-volatile memory component 448, which may be in a per-sector format, to a per-servo-ID format that may be expected by servo controller 480, or that servo controller 480 may be configured to receive and process and execute on. Thus, ATI compensator circuitry 430 may be configured, in response to a discontinuity for the subject sector, to apply filter 460 to the servo trajectory, in various examples. ATI compensator circuitry 430 may be configured to convert the servo trajectory to a per-servo-ID servo control signal, and to output the per-servo-ID servo control signal to servo controller 480, in various examples. ATI compensator circuitry 430 may be configured such that applying filter 460 to the servo trajectory is comprised in converting the servo trajectory to a per-servo-ID servo control signal, in various examples.

The systems, components, features, techniques, and methods described herein may be applied and used in both conventional magnetic recording (CMR) and shingle magnetic recording (SMR), in various examples. The servo trajectories as generated and described herein may be implemented as ATI-aware modifications to PES features and/or PES data, in various examples. For example, various aspects described herein may be implemented as ATI adjustments to SMR PES features in some SMR implementations. Various aspects described herein may also be highly advantageous in CMR implementations.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface among the one or more disks; and
   one or more processing devices configured to:
      detect adjacent track interference (ATI) due to a write operation in an adjacent sector to a sector subjected to a write or read operation on the corresponding disk surface; and
      generate a readback servo trajectory for the sector subjected to the write or read operation, based on a position error signal (PES) for the sector subjected to the write or read operation, a PES for the adjacent sector, and the ATI due to the write operation in the adjacent sector.

2. The data storage device of claim 1, wherein the one or more processing devices are further configured to generate the readback servo trajectory such that the readback servo trajectory yields a higher signal-to-noise ratio (SNR) for the sector subjected to the write or read operation than performing the read operation of the sector subjected to the write or read operation based on a track-center servo trajectory.

3. The data storage device of claim 1, wherein the one or more processing devices are further configured to store the readback servo trajectory for the sector subjected to the write or read operation in a non-volatile memory component.

4. The data storage device of claim 1, wherein the one or more processing devices are further configured to use the readback servo trajectory for the sector subjected to the write or read operation for performing the read operation of the sector subjected to the write or read operation.

5. The data storage device of claim 1, wherein the one or more processing devices are further configured to store the PES for the sector subjected to the write or read operation prior to the write operation in the adjacent sector.

6. The data storage device of claim 5, wherein the one or more processing devices are further configured to store the PES for the sector subjected to the write or read operation in a non-volatile memory component.

7. The data storage device of claim 1, wherein the ATI is a first ATI detected in the adjacent sector on a first side of the sector subjected to the write or read operation, and the readback servo trajectory is an initial readback servo trajectory, wherein the one or more processing devices are further configured to:
   detect a second ATI due to a write operation in a second adjacent sector on a second side of the sector subjected to the write or read operation; and
   generate a modified readback servo trajectory for the sector subjected to the write or read operation based on the initial readback servo trajectory, the PES for the second adjacent sector, and the second ATI.

8. The data storage device of claim 7, wherein the one or more processing devices are further configured to designate two bits per sector subjected to the write or read operation in a data store for indicating whether ATI has been detected on the first side and on the second side of the sector subjected to the write or read operation.

9. The data storage device of claim 1, wherein the sector subjected to the write or read operation is one of a plurality of subject sectors comprised in a subject track, and wherein the one or more processing devices are further configured to store, in a memory component, respective servo trajectories for the plurality of subject sectors comprised in the subject track.

10. The data storage device of claim 9, wherein the memory component is a first memory component, wherein the one or more processing devices are further configured to store the respective servo trajectories for the plurality of subject sectors comprised in the subject track from the first memory component to a contiguously readable block in a non-volatile memory component.

11. The data storage device of claim 1, wherein the one or more processing devices are further configured to record an indication of whether a subject track that comprises the sector subjected to the write or read operation has been subject to new write operations in one or more further sectors of the subject track subsequent to generating the readback servo trajectory for the sector subjected to the write or read operation.

12. The data storage device of claim 11, wherein the one or more processing devices are further configured, in response to the subject track having been subject to a new write operation in one or more further sectors of the subject track subsequent to generating the readback servo trajectory for the sector subjected to the write or read operation, to use conventional PES values for the read operation of the subject track.

13. The data storage device of claim 11, wherein the one or more processing devices are further configured, in response to the subject track having been subject to a new write operation in one or more further sectors thereof subsequent to generating the readback servo trajectory for the sector subjected to the write or read operation, to generate a readback servo trajectory, for the subject track, using both data from a first memory component on the write operation in the one or more further sectors of the subject track, and the readback servo trajectory for the sector subjected to the write or read operation from a second memory component that comprises a non-volatile memory component.

14. The data storage device of claim 1, wherein the one or more processing devices are further configured, in response to a discontinuity in a nominal trajectory between the sector subjected to the write or read operation and a previous sector or a following sector, to apply a filter to the readback servo trajectory.

15. The data storage device of claim 1, wherein the one or more processing devices are further configured to convert the readback servo trajectory to a per-servo-ID servo control signal.

16. A method comprising:
detecting, with one or more processors, adjacent track interference (ATI) due to a write operation in an adjacent sector to a sector subjected to a write or read operation on a disk surface of a data storage device; and
generating, with one or more processors, a readback servo trajectory for operating a head proximate to the sector subjected to the write or read operation, based on a position error signal (PES) for the sector subjected to the write or read operation, a PES for the adjacent sector, and the ATI.

17. The method of claim 16, further comprising generating the readback servo trajectory such that the readback servo trajectory yields a higher signal-to-noise ratio (SNR) for the sector subjected to the write or read operation in the read operation than performing the read operation of the sector subjected to the write or read operation based on a track-center servo trajectory.

18. The method of claim 16, further comprising storing the readback servo trajectory for the sector subjected to the write or read operation in a non-volatile memory component.

19. One or more processing devices comprising:
means for detecting adjacent track interference (ATI) due to a write operation in an adjacent sector to a sector subjected to a write or read operation on a disk surface of a data storage device; and
means for generating a readback servo trajectory for operating a head proximate to the sector subjected to the write or read operation, based on a position error signal (PES) for the sector subjected to the write or read operation, a PES for the adjacent sector, and the ATI.

20. The one or more processing devices of claim 19, further comprising means for generating the readback servo trajectory such that the readback servo trajectory yields a higher signal-to-noise ratio (SNR) for the sector subjected to the write or read operation in the read operation than performing the read operation of the sector subjected to the write or read operation based on a track-center servo trajectory.

* * * * *